US007512235B2

(12) United States Patent  
Multerer et al.

(10) Patent No.: US 7,512,235 B2  
(45) Date of Patent: *Mar. 31, 2009

(54) MULTIPLE USER AUTHENTICATION FOR ONLINE CONSOLE-BASED GAMING

(75) Inventors: Boyd C. Multerer, Seattle, WA (US); Darren L. Anderson, Bellevue, WA (US); Ling Tony Chen, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/530,373

(22) Filed: Sep. 8, 2006

(65) Prior Publication Data

US 2007/0010334 A1    Jan. 11, 2007

Related U.S. Application Data

(62) Division of application No. 09/802,795, filed on Mar. 9, 2001, now Pat. No. 7,218,739.

(51) Int. Cl.
*H04K 1/00*    (2006.01)
(52) U.S. Cl. ................ 380/251; 713/150; 713/168; 713/169; 713/170; 726/5; 726/9; 726/10; 463/43
(58) Field of Classification Search ........ 380/251; 713/150, 168, 169, 170; 725/138; 726/5, 726/9, 10; 463/43
See application file for complete search history.

(56) References Cited

U.S. PATENT DOCUMENTS

| 4,296,476 | A | 10/1981 | Mayer et al. |
| 4,432,067 | A | 2/1984 | Nielsen |
| 4,881,164 | A | 11/1989 | Hailpern et al. |
| 4,905,280 | A | 2/1990 | Wiedemer |
| 5,274,762 | A | 12/1993 | Peterson et al. |
| 5,367,698 | A | 11/1994 | Webber et al. |
| 5,382,983 | A | 1/1995 | Kwoh et al. |
| 5,393,072 | A | 2/1995 | Best |
| 5,459,487 | A | 10/1995 | Bouton |
| 5,475,835 | A | 12/1995 | Hickey |

(Continued)

FOREIGN PATENT DOCUMENTS

CA    2201276    9/1998

(Continued)

OTHER PUBLICATIONS

Gong, Enclaves: Enabling Secure Collaboration Over the Internet, 1997, IEEE, pp. 567-575.*

(Continued)

*Primary Examiner*—Beemnet W Dada
(74) *Attorney, Agent, or Firm*—Lee & Hayes, PLLC

(57) ABSTRACT

A console-based multi-user authentication process allows multiple users of a game console to be authenticated together in a single request/reply exchange with an authentication entity. The results of which is the possession of a single ticket that can be used to prove authenticity of multiple authentication principals to one or more online services. Also described is a handshake process that can be used to initially establish an authentication account for each game console, in which the account creation server can trust that a genuine game console is making the request.

16 Claims, 6 Drawing Sheets

U.S. PATENT DOCUMENTS

| | | |
|---|---|---|
| 5,550,575 A | 8/1996 | West et al. |
| 5,551,701 A | 9/1996 | Bouton et al. |
| 5,557,541 A | 9/1996 | Schulhof et al. |
| 5,558,339 A | 9/1996 | Perlman |
| 5,566,315 A | 10/1996 | Mililo et al. |
| 5,592,651 A | 1/1997 | Rackman |
| 5,598,276 A | 1/1997 | Cookson et al. |
| 5,611,066 A | 3/1997 | Keele et al. |
| 5,634,849 A | 6/1997 | Abecassis |
| 5,649,862 A | 7/1997 | Sakaguchi et al. |
| 5,659,742 A | 8/1997 | Beattie et al. |
| 5,675,752 A | 10/1997 | Scott et al. |
| 5,680,323 A | 10/1997 | Barnard |
| 5,706,510 A | 1/1998 | Burgoon |
| 5,716,273 A | 2/1998 | Yuen |
| 5,726,909 A | 3/1998 | Krikorian |
| 5,732,266 A | 3/1998 | Moore et al. |
| 5,735,744 A | 4/1998 | Okamoto |
| 5,745,574 A | 4/1998 | Muftic |
| 5,752,883 A | 5/1998 | Butcher et al. |
| 5,791,992 A | 8/1998 | Crump et al. |
| 5,798,921 A | 8/1998 | Johnson et al. |
| 5,835,759 A | 11/1998 | Moore et al. |
| 5,841,979 A | 11/1998 | Schulhof et al. |
| 5,872,915 A * | 2/1999 | Dykes et al. .................. 726/5 |
| 5,876,286 A | 3/1999 | Lee |
| 5,878,134 A | 3/1999 | Handelman et al. |
| 5,892,900 A | 4/1999 | Ginter et al. |
| 5,896,125 A | 4/1999 | Niedzwiecki |
| 5,915,238 A | 6/1999 | Tjaden |
| 5,917,256 A | 6/1999 | Broadbent, II |
| 5,918,223 A | 6/1999 | Blum et al. |
| 5,946,278 A | 8/1999 | Tower |
| 5,969,283 A | 10/1999 | Looney et al. |
| 5,973,683 A | 10/1999 | Cragun et al. |
| 5,978,920 A | 11/1999 | Lee |
| 5,980,261 A | 11/1999 | Mino et al. |
| 5,993,319 A | 11/1999 | Aoyama |
| 6,001,015 A | 12/1999 | Nishiumi et al. |
| 6,005,597 A | 12/1999 | Barrett et al. |
| 6,009,433 A | 12/1999 | Kurano et al. |
| 6,011,758 A | 1/2000 | Dockes et al. |
| 6,012,068 A | 1/2000 | Boezeman et al. |
| 6,022,274 A | 2/2000 | Takeda et al. |
| 6,025,869 A | 2/2000 | Stas et al. |
| 6,031,795 A | 2/2000 | Wehmeyer |
| 6,043,818 A | 3/2000 | Nakano et al. |
| 6,093,880 A | 7/2000 | Arnalds |
| 6,115,079 A | 9/2000 | McRae |
| 6,119,116 A | 9/2000 | Rose |
| 6,122,617 A | 9/2000 | Tjaden |
| 6,128,255 A | 10/2000 | Yankowski |
| 6,128,625 A | 10/2000 | Yankowski |
| 6,292,892 B1 | 9/2001 | Davis |
| 6,540,614 B1 | 4/2003 | Nishino et al. |
| 6,564,056 B1 | 5/2003 | Fitzgerald |
| 6,875,021 B2 | 4/2005 | Okamoto |
| 7,218,739 B2 * | 5/2007 | Multerer et al. ............. 380/251 |
| 2001/0004609 A1 | 6/2001 | Walker et al. |
| 2002/0071557 A1* | 6/2002 | Nguyen ...................... 380/251 |
| 2002/0077177 A1 | 6/2002 | Elliot |
| 2002/0121297 A1 | 9/2002 | Li et al. |
| 2002/0152377 A1 | 10/2002 | Bauman et al. |
| 2003/0008715 A1 | 1/2003 | Huberm et al. |
| 2003/0078097 A1 | 4/2003 | Okamoto |
| 2003/0227473 A1 | 12/2003 | Shih et al. |
| 2004/0005924 A1 | 1/2004 | Watabe et al. |
| 2004/0162137 A1 | 8/2004 | Scott |

FOREIGN PATENT DOCUMENTS

| | | |
|---|---|---|
| DE | 10046437 | 4/2002 |
| EP | 0762260 | 3/1997 |
| EP | 0809214 | 11/1997 |
| EP | 0889420 A2 | 1/1999 |
| EP | 0998966 | 5/2000 |
| EP | 1035706 | 9/2000 |
| EP | 1126425 A2 | 8/2001 |
| FR | 2743434 A | 7/1997 |
| GB | 2276971 A | 10/1994 |
| JP | 1010467 | 1/1989 |
| JP | 64010467 | 1/1989 |
| JP | 01201746 | 8/1989 |
| JP | 3135636 | 6/1991 |
| JP | 3224047 A | 10/1991 |
| JP | 5100939 A | 4/1993 |
| JP | 6061390 | 3/1994 |
| JP | 0661390 | 8/1994 |
| JP | 06301609 | 10/1994 |
| JP | 07039649 | 2/1995 |
| JP | 7160467 | 6/1995 |
| JP | 7249283 | 9/1995 |
| JP | 8016554 | 1/1996 |
| JP | 10243015 | 9/1998 |
| JP | 10260939 | 9/1998 |
| JP | 10327147 | 12/1998 |
| JP | 11207034 | 8/1999 |
| JP | 11237941 | 8/1999 |
| JP | 11317061 | 11/1999 |
| JP | 2000036015 A | 2/2000 |
| JP | 2000070547 | 3/2000 |
| JP | 2000107424 | 4/2000 |
| JP | 2000149386 | 5/2000 |
| JP | 2000157724 | 6/2000 |
| JP | 2000228051 | 8/2000 |
| JP | 2000511378 T | 8/2000 |
| JP | 2000348466 | 12/2000 |
| JP | 2001058087 | 3/2001 |
| JP | 2001325134 | 11/2001 |
| WO | WO9714151 | 4/1997 |
| WO | WO9746016 | 12/1997 |
| WO | WO9856179 A | 12/1998 |
| WO | WO0033572 | 6/2000 |
| WO | WO0040027 | 7/2000 |
| WO | WO0051036 | 8/2000 |
| WO | WO0105477 | 1/2001 |
| WO | WO0108148 A1 | 2/2001 |
| WO | WO0183055 A3 | 11/2001 |
| WO | WO0184768 | 11/2001 |
| WO | WO2006033941 A1 | 3/2006 |

OTHER PUBLICATIONS

Bolosky et al., "Single Instance Storage in Windows 2000" Proceedings of the Usenix Windows Systems Symposium, vol. 4, Aug. 3, 2000, pp. 13-21.

"Sega Dreamcast User Manual", retrieved on Oct. 16, 2006 at <<http://www/gamemanuals.net/download/11eed12c65503f83e99b0c58bd7450bd/Dreamcast_(EN)_[Hardware].pdf>>, The Game Manual, Sep. 9, 1999, pp. 2-31.

Cleef, "Playstation Mod Chip FAQ", at <<http://modchip.aeug.org/faq.html>>, 1999, pp. 6.

Weise, "Public Key Infrastructure Overview", Sun Microsystems, Inc., 2001, pp. 29.

"Exploring Reality of X-Box Microsoft Game Machine", Personal Computer Journal "Monthly ASCII", Japan, ASCII Corporation, May 1, 2000, vol. 24/No. 5/ Serial vol. No. 275, pp. 204-209, ISSN-0386 to 5428.

Kasahara, "Follow-up Report! Operational Verification of Pentium III-compatible Applicationd & Compatible Chip Mother," DOS/V Magazine, Softbank Publishing Inc., May 1, 1999, vol. 8, No. 9, pp. 130-137.
Tyson, "How BIOS Works", retrieved on Jan. 3, 2008, at <<http://web.archive.org/web/20030402071946/computer.howstuffworks.com/bios1.htm>>, pp. 1-3.
Official Notice Of Rejection For Japanese Patent Application No. 2002-064294 Mailed On Apr. 14, 2006, pp. 16.
Official Notice Of Rejection For Japanese Patent Application No. 2006-172872 Mailed On Oct. 12, 2007, pp. 10.
Menezes, et al., "Handbook of Applied Cryptography", pp CRC Press LLC, 1997, pp. 1-4.
Moda, "X-Box: Looking into the Nature of Microsoft's Game Machine", ASCII, Japan, ASCII Corporation, May 1, 2000, vol. 24, No. 5, pp. 204-209.
"This simplifies HARD DISK", ASCII, Japan, ASCII Corporation, Apr. 1, 1991, vol. 15, No. 4, pp. 250-257.
U.S. Appl. No. 60/201,163, filed May 2, 2000, Shih, et al., "Real Time Incorporation of Personalized Audio into Video Game".
U.S. Appl. No. 60/252,760, filed Nov. 22, 2000, Shih, et al., "Real Time Incorporation of Personalized Audio into Video Game".
"CES: Bill Gates zeigt die Xbox", Golem.de 'Online!, retrieved on Jun. 18, 2004 from <<http://dyn1.golem.de/cgi-bin/usisapi.dll/forprint??id11561>>, Jan. 6, 2000, 2 pages.
Chang, et al., "DMMX: Dynamic Memory Management Extensions", Journal of Systems and Software, vol. 63, No. 3, Sep. 2002, pp. 187-199.
"Dex Drive Manual", gameshark, retrieved from <<http://www.angelfire.com/games/winospsxdexdrive/dexdrive.pdf>>, 1998, pp. 1-15.
"DFU Verigindung herstellen" FAQ, 'Online! XPOO2318226 retrieved from <<www.puretec.de>>, 2000, 1 page.
Gordon, "Interviews—John Gildred of Indrema on the L600", Planet GeForce Interview, Oct. 19, 2000, 5 pages.
Hall, et al., "Remote Electronic Gambling", Computer Security Applications Conference, Proceedings 13th Annual, Dec. 8-12, 1997, pp. 232-238.
"IGN64's Ultimate 64DD FAQ—Everything you ever wanted to know about the upcoming disk drive add-on", accessed on Apr. 14, 2005 from <<http://ign64.ign.com/articles/071/071383p1.html>>, Dec. 15, 1999, 12 pages.
Jimbo, et al., "Optimal Authentication Systems and Combinatorial Designs", IEEE Transactions on Information Theory, vol. 36, Issue 1, Jan. 1990, pp. 54-62.
Lehrbaum, "Linux fuels game console plus", ZDNetUK News, Linux Devices.com, Special to ZDNet, Jul. 7, 2000, 3 pages.
"Links 386CD Players Manual", 1995 Access Software Inc., pp. 1-87.
"Metropolis Street Racer", retrieved on Jul. 9, 2006 from <<http://en.wikipedia.org/wiki/Metropolis_Street_Racer>>, Sega, Jan. 17, 2001, 3 pages.
"Metropolis Street Racer review", DailyRadar.com, Jan. 13, 2000, 5 pages.
Mowatt, "Indrema: Linux-Based Console", CNET Gamecenter.com, Aug. 11, 2000, 2 pages.
Nacira, et al., "Secured Net-Banking by /spl thera/-VIGENERE in Syverson's Protocol", Computer Systems and Applications, 2005, The 3rd ACS/IEEE International Conference 2005, 6 pages.
Perenson, "Play Back Media Your Way", PC World 'Online!, Jun. 1, 2000, retrieved on Jul. 8, 2004 from <<http://www.pcworld.com/resource/printable/0aid1700100.asp>>, 6 pages.
"PlayStation 2 Instruction Manual", 'Online! 2000 Sony Computer Entertainment, retrieved on Jun. 18, 2004 from <<www.playstation.com>>, 29 pages.
"PlayStation 2, Dreamcast, and 64DD: Aiming at Increasing Customers by Integration with the Net", Nikkei Trendy, No. 169, Japan, Nikkei Home Publishing Inc., Jul. 25, 2000, Extra Edition/Serial No. 169, pp. 16-19.

"PS2 Frequently Asked Questions", All Playstation2 'Online! retrieved on Jun. 28, 2004 from <<http://www.allps2.net/ps2_faq.html>>, Jul. 29, 2000, 7 pages.
Quinlan, "Filesystem Hierarchy Standard—Version 2.0", retrieved on Nov. 18, 2004 from <<http://www.lisoleg.net/lisoleg/fs/fhs.pdf>>, Oct. 26, 1997, 39 pages.
Schneier, "Applied Cryptography," John Wiley & Sons, Second Edition, 1996, pp. 32 and 33.
Schneier, "Applied Cryptography", Applied Cryptography. Protocols, Algorithms and Source Code in C, New York, John Wiley & Sons, US, 1996, pp. 574-577.
Sherman, et al., "Secure network Access Using Multiple Applications of AT&T's Smart Card", AT&T Technical Journal, American Telephone and Telegraph Co. New York, US, vol. 73, No. 5, Sep. 1, 1994, pp. 61-72.
Stallings, "Cryptography and network security: Principles and Practice", Second Edition Prentice Hall 1999, pp. 330 and 333-338.
Suarez, "Sony PlayStation 2", The Digital Bits 'Online!, retrieved on Jun. 18, 2004 from <<http://www.thedigitalbits.com/reviews/ps2/sonyps2*.html>>, Nov. 15, 2000, 7pages.
Takahashi, "Microsoft goes gaming. (product Development)" Electronic Business, May 2000, 2 pages.
"The 64DD Connection—Here's how the 64DD and the Nintendo 64 connect", IGN.com, Oct. 20, 1999, 5 pages.
"The 64DD: Nintendo's Disk Drive—Everything you ever wanted to know about the N64's first major add-on", IGN.com, Jan. 28, 1997, 7 pages.
Thurrott, "Windows Media Player 7 reviewed", Winsupersite, Aug. 15, 2000 retrieved on Jun. 18, 2004 from <<http://www.winsupersite.com/reviews/wmp7.asp>>, Jan. 28, 2004, 5 pages.
"TV Incapable of Displaying Images", Nikkei Electronics, May 22, 2000 Issue, Japan, Nikkei Business Publications, Inc., May 22, 2000, No. 770, pp. 141-158.
"US version of Playstation2 to have modem hard drive", By Bloomberg News, Apr. 14, 2000, 2 pages.
"User Manual: Metropolis Street Racer", Sega Enterprises, game 2000, 18 pages.
"What is the 64DD?", IGN.com, Sep. 17, 1997, 9 pages.
Press Pass "Xbox to Deliver Ultimate Console Gaming Experience", San Jose Ca, retrieved on Apr. 14, 2005 from <<http://www.microsoft.com/presspass/features/2000/03_10xbox.asp>>, Mar. 10, 2000, 3 pages.
"XBOX, ASCII, the March issue, 2001 (The Anatomy of XBOX which is Inaccessable to the Readers of Game Magazines: The Latest Information of the War for TV Viewers at the Present Stage in 21st Century", ASCII Corporation, Mar. 1, 2001, vol. 25, No. 3, pp. 249-264.
"History of Massively Multiplayer Online Games", retrieved Jun. 13, 2008 at <<http://en.wikipedia.org/wiki/History_of_massively_multiplayer_online_games>>, Wikipedia, pp. 1-10.
Multerer, "Channel 9 MSDN Video", retrieved Jun. 27, 2008 at <<http://www.microsoft.com/downloadS/details.aspx?FamilyID=ac2cc5b6-f261-43ab-9a09-cf53b5586f1f&displaylang=en>>, Microsoft Download Center, Aug. 18, 2004, pp. 1-2.
"SegaNet", retrieved Jun. 19, 2008 at <<http://en.wikipedia.org/wiki/SegaNet>>, Wikipedia, pp. 1-5.
Shirali-Shahreza, "Login to Internet Websites by Next Generation Game Console", 2006 IEEE/IFIP International conference in Central Asia, Sep. 2006, pp. 1-4.
Voth, "Evolutions in Gaming", Pervasive Computing, vol. 6, Issue 2, Apr.-Jun. 2007, pp. 7-10.
"XBox Live", retrieved Jun. 13, 2008 at <<http://en.wikipedia.org/wiki/Xbox_Live>>, Wikipedia, pp. 1-21.
"Windows Media Manager 1996" retreived from the internet <<http://www.sharewarejunkie.com/8lm3/mediamgr.htm>>.
"Windows Media Player 7.0, Online Help".
Windows Media Player 7.0 (Screenshots for D6).

* cited by examiner

MULTIPLE USER AUTHENTICATION FOR ONLINE CONSOLE-BASED GAMING

RELATED APPLICATIONS

This application is a divisional of and claims priority to U.S. patent application Ser. No. 09/802,795 entitled "Multiple User Authentication for Online Console-Based Gaming" filed Mar. 9, 2001 to Multerer et al., the disclosure of which is incorporated by reference herein

TECHNICAL FIELD

This invention relates to console-based gaming systems, and more particularly, to methods for authenticating multiple identities in a single reply/request exchange between a game console and an authentication entity.

BACKGROUND

Traditionally, gaming systems with a dedicated console were standalone machines that accommodated a limited number of players (e.g., 4). PC-based gaming grew in popularity in part due to the ability to play games online with many remote players over a network (e.g., the Internet). Thus, one trend for dedicated gaming systems is to provide broadband capabilities to facilitate online is gaming. Microsoft Corporation recently announced its Xbox™ video gaming system that is equipped with a hard disk drive to enhance gaming, and broadband connectivity to support online gaming.

Creating an online gaming system for a dedicated console poses several unique and difficult problems. One problem concerns authentication of the participants. To establish an online gaming event, a local game being played on one game console goes online and communicates with other game consoles, players, and/or online services. This involves some level of trust among the participants, which the game attempts to establish by identifying itself, the game console, and the one or more players currently on the machine to other participants on the network in a secure manner. Additionally, the game console may also want to discover trusted services with which it can communicate over the network.

The PC-based games do not experience such problems. For instance, PC-based games do not typically experience multiple simultaneous users; rather only a single user is involved in the online game. On a PC, the users can easily enter their data via keyboard and the trusted services are easily configurable. Also, PC users tolerate network operations that take a little longer. If the PC game takes five extra seconds to start because it is making multiple round-trips to an authentication server, no one will complain. This is not the case in the gaming world.

Accordingly, the constraints on a dedicated game console make authentication a difficult problem for the following reasons:
  Consoles do not have keyboards. Game controllers are not efficient data-entry devices, thus user-entered data should be kept to a minimum.
  Gaming systems are plug-and-go; they plug into the wall and are ready for play. Configuration is not expected or tolerated in the game console community.
  Console games should be playable with as little start up time as possible. Players expect to put a game disk into the console, turn it on, and be playing the game a few seconds later.
  Consoles are a closed development environment in order to ensure high content quality. Thus, consoles need to know that they are communicating with trusted, quality controlled services. The need for trusted communications is further driven by the addition of a hard disk drive into the console in that any malicious damage rendered to the hard disk drive's data by an external source makes it difficult or impossible to repair without reformatting.

Cheating is not yet a major problem in the online console-based gaming community. In anticipation that it might one day pose a problem, there is a need for a solution that addresses cheating. Part of the solution is to make the console itself as secure as possible and tamper resistant, such that any tampering by a user will be discovered or render the console inoperable. While security and tamper resistant solutions help, it does not prevent the case where a rogue player writes PC software to emulate a console machine on the network, enabling cheating without a game console.

To prevent such impostor cheating, there is a need for an authentication protocol that verifies a player claiming to be on a console machine really is that player, as well as guarantees that the game console is indeed a trusted game console and not an impostor or one that has been compromised.

SUMMARY

A console-based multi-user authentication process allows multiple users of a game console to be authenticated together in a single request/reply exchange with an authentication entity.

In the described implementation, the game console is equipped with a hard disk drive, a portable media drive, and broadband connectivity to enable network access to a ticket issuing entity and one or more online services. When the game console desires to use the online service, it first obtains a ticket for that service from the ticket issuing entity. The game console submits a request to the ticket issuing entity that contains a game console identity, the identities of the multiple users, and an identity of the desired online service.

In response, the ticket issuing entity generates a ticket containing the game console identity and the multiple user identities together encrypted with the online service's key. The ticket issuing entity returns the ticket to the game console, which passes it onto the online service. The online service uses the ticket to verify the authenticity of the game console and the multiple users. In this manner, the single ticket obtained from the ticket issuing entity proves the particular game console as well as the multiple user identities playing at the game console.

The game console identity is created when the game console first establishes a game account for online gaming. During manufacturing, the game console is constructed with pieces of information that may be made available programmatically (e.g., hard disk ID, CPU ID, serial number, random number, a value derived as a function of an ID or serial number, a quantity or some other mark written onto the hard drive, etc.). This information is recorded in a database, which is subsequently made available to an authentication server. When the game console seeks a game account, it submits the pieces of information to the authentication server. Using the database, the server evaluates whether the pieces are legitimate and correspond to a game console that has not yet established an account. If the evaluation proves positive, a game account is created for that game console and the game console identity is assigned to the game console.

DETAILED DESCRIPTION

The following discussion is directed to console-based online gaming systems and techniques for authenticating multiple identities—game console, game title, multiple users—in one authentication roundtrip. The discussion assumes that the reader is familiar with basic cryptography principles, such as encryption, decryption, authentication, hashing, and digital signatures. For a basic introduction to cryptography, the reader is directed to a text written by Bruce Schneier and entitled, "Applied Cryptography: Protocols, Algorithms, and Source Code in C," published by John Wiley & Sons, copyright 1994 (second edition 1996), which is hereby incorporated by reference.

Gaming System

Figure 1:
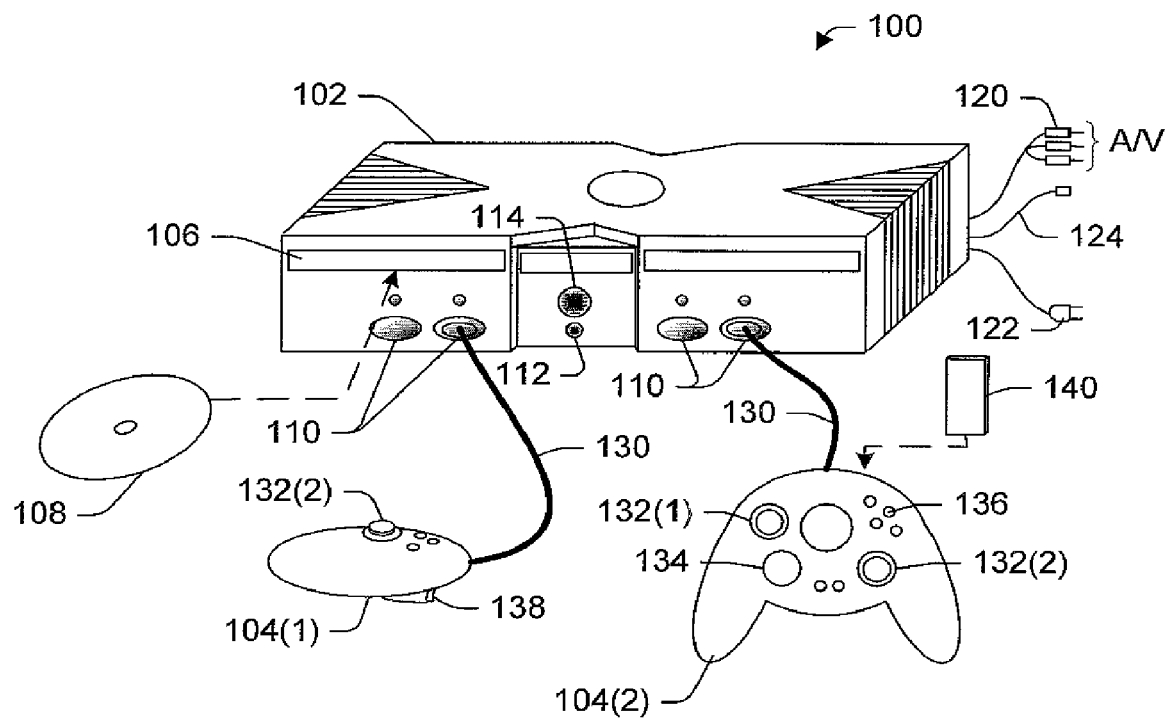
FIG. 1 illustrates a gaming system with a game console and one or more controllers.

FIG. 1 shows an exemplary gaming system 100. It includes a game console 102 and up to four controllers, as represented by controllers 104(1) and 104(2). The game console 102 is equipped with an internal hard disk drive and a portable media drive 106 that supports various forms of portable storage media as represented by optical storage disc 108. Examples of suitable portable storage media include DVD, CD-ROM, game discs, game cartridges, and so forth.

The game console 102 has four slots 110 on its front face to support up to four controllers, although the number and arrangement of slots may be modified. A power button 112 and an eject button 114 are also positioned on the front face of the game console 102. The power button 112 switches power to the game console and the eject button 114 alternately opens and closes a tray of the portable media drive 106 to allow insertion and extraction of the storage disc 108.

The game console 102 connects to a television or other display (not shown) via A/V interfacing cables 120. A power cable 122 provides power to the game console. The game console 102 may further be configured with broadband capabilities, as represented by the cable or modem connector 124 to facilitate access to a network, such as the Internet.

Each controller 104 is coupled to the game console 102 via a wire or wireless interface. In the illustrated implementation, the controllers are USB (Universal Serial Bus) compatible and are connected to the console 102 via serial cables 130. The controller 102 may be equipped with any of a wide variety of user interaction mechanisms. As illustrated in FIG. 1, each controller 104 is equipped with two thumbsticks 132(1) and 132(2), a D-pad 134, buttons 136, and two triggers 138. These mechanisms are merely representative, and other known gaming mechanisms may be substituted for or added to those shown in FIG. 1.

A memory unit (MU) 140 may be inserted into the controller 104 to provide additional and portable storage. Portable memory units enable users to store game parameters and port them for play on other consoles. In the described implementation, each controller is configured to accommodate two memory units 140, although more or less than two units may be employed in other implementations.

The gaming system 100 is capable of playing, for example, games, music, and videos. With the different storage offerings, titles can be played from the hard disk drive or the portable medium 108 in drive 106, from an online source, or from a memory unit 140. A sample of what the gaming system 100 is capable of playing back include:

1. Game titles played from CD and DVD discs, from the hard disk drive, or from an online source.
2. Digital music played from a CD in the portable media drive 106, from a file on the hard disk drive (e.g., Windows Media Audio (WMA) format), or from online streaming sources.
3. Digital audio/video played from a DVD disc in the portable media drive 106, from a file on the hard disk drive (e.g., Active Streaming Format), or from online streaming sources.

Figure 2:
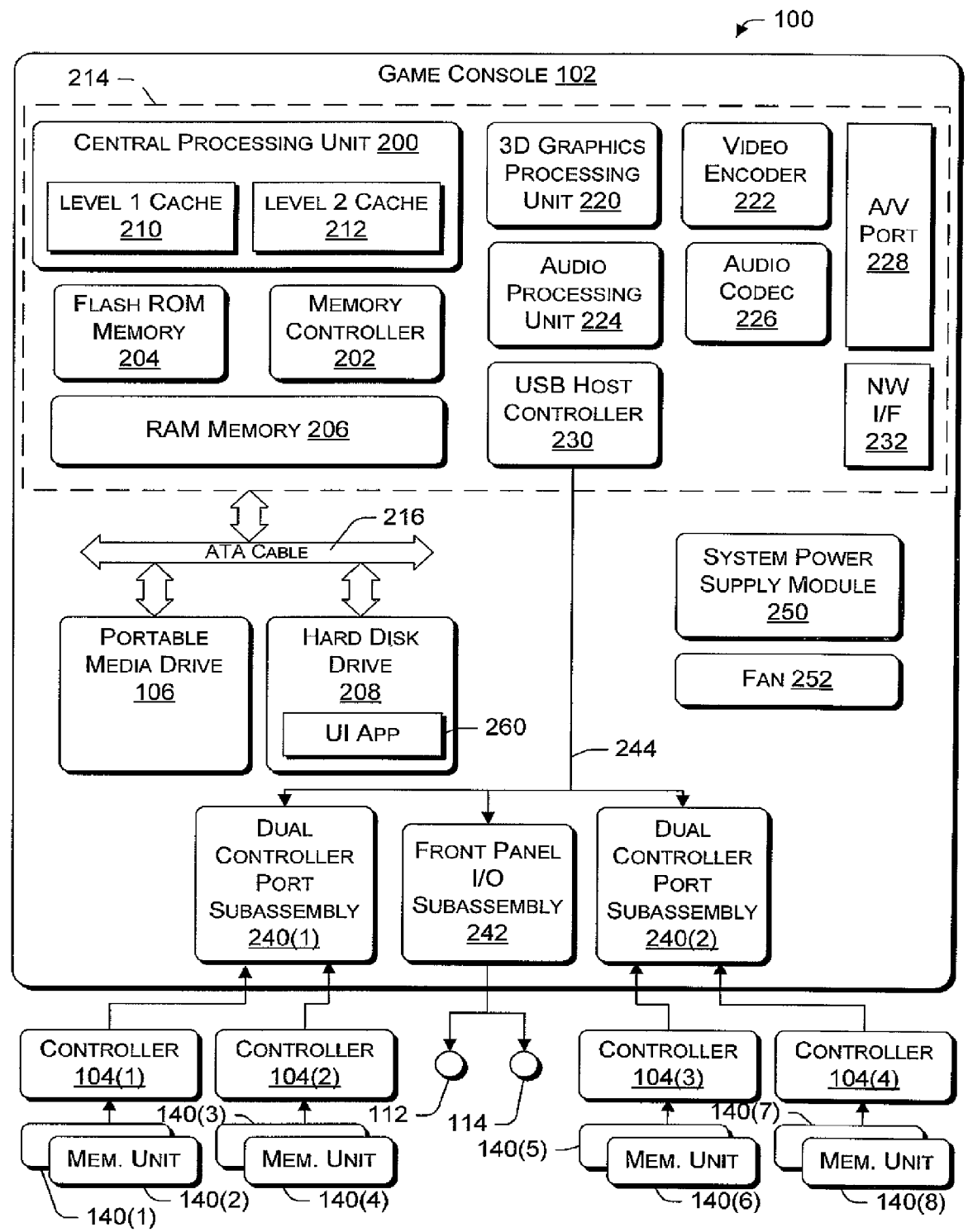
FIG. 2 is a block diagram of the gaming system.

FIG. 2 shows functional components of the gaming system 100 in more detail. The game console 102 has a central processing unit (CPU) 200 and a memory controller 202 that facilitates processor access to various types of memory, including a flash ROM (Read Only Memory) 204, a RAM (Random Access Memory) 206, a hard disk drive 208, and the portable media drive 106. The CPU 200 is equipped with a level 1 cache 210 and a level 2 cache 212 to temporarily store data and hence reduce the number of memory access cycles, thereby improving processing speed and throughput.

The CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

As one suitable implementation, the CPU 200, memory controller 202, ROM 204, and RAM 206 are integrated onto a common module 214. In this implementation, ROM 204 is configured as a flash ROM that is connected to the memory controller 202 via a PCI (Peripheral Component Interconnect) bus and a ROM bus (neither of which are shown). RAM 206 is configured as multiple DDR SDRAM (Double Data Rate Synchronous Dynamic RAM) that are independently controlled by the memory controller 202 via separate buses (not shown). The hard disk drive 208 and portable media drive 106 are connected to the memory controller via the PCI bus and an ATA (AT Attachment) bus 216.

A 3D graphics processing unit 220 and a video encoder 222 form a video processing pipeline for high speed and high resolution graphics processing. Data is carried from the graphics processing unit 220 to the video encoder 222 via a digital video bus (not shown). An audio processing unit 224 and an audio codec (coder/decoder) 226 form a corresponding audio processing pipeline with high fidelity and stereo processing. Audio data is carried between the audio processing unit 224 and the audio codec 226 via a communication link (not shown). The video and audio processing pipelines output data to an A/V (audio/video) port 228 for transmission to the television or other display. In the illustrated implementation, the video and audio processing components 220-228 are mounted on the module 214.

Also implemented on the module 214 are a USB host controller 230 and a network interface 232. The USB host controller 230 is coupled to the CPU 200 and the memory controller 202 via a bus (e.g., PCI bus) and serves as host for the peripheral controllers 104(1)-104(4). The network interface 232 provides access to a network (e.g., Internet, home network, etc.) and may be any of a wide variety is of various wire or wireless interface components including an Ethernet card, a modem, a Bluetooth module, a cable modem, and the like.

The game console 102 has two dual controller support subassemblies 240(1) and 240(2), with each subassembly supporting two game controllers 104(1)-104(4). A front panel I/O subassembly 242 supports the functionality of the power button 112 and the eject button 114, as well as any LEDs (light emitting diodes) or other indicators exposed on the outer surface of the game console. The subassemblies 240(1), 240(2), and 242 are coupled to the module 214 via one or more cable assemblies 244.

Eight memory units 140(1)-140(8) are illustrated as being connectable to the four controllers 104(1)-104(4), i.e., two memory units for each controller. Each memory unit 140 offers additional storage on which games, game parameters, and other data may be stored. When inserted into a controller, the memory unit 140 can be accessed by the memory controller 202.

A system power supply module 250 provides power to the components of the gaming system 100. A fan 252 cools the circuitry within the game console 102.

A console user interface (UI) application 260 is stored on the hard disk drive 208. When the game console is powered on, various portions of the console application 260 are loaded into RAM 206 and/or caches 210, 212 and executed on the CPU 200. The console application 260 presents a graphical user interface that provides a consistent user experience when navigating to different media types available on the game console.

The game console 102 implements a cryptography engine to perform common cryptographic functions, such as encryption, decryption, authentication, digital signing, hashing, and the like. The cryptography engine may be implemented as part of the CPU 200, or in software stored on the hard disk drive 208 that executes on the CPU, so that the CPU is configured to perform the is cryptographic functions.

The gaming system 100 may be operated as a standalone system by simply connecting the system to a television or other display. In this standalone mode, the gaming system 100 allows one or more players to play games, watch movies, or listen to music. However, with the integration of broadband connectivity made available through the network interface 232, the gaming system 100 may further be operated as a participant in a larger network gaming community. This network gaming environment is described next.

Network Gaming

Figure 3:
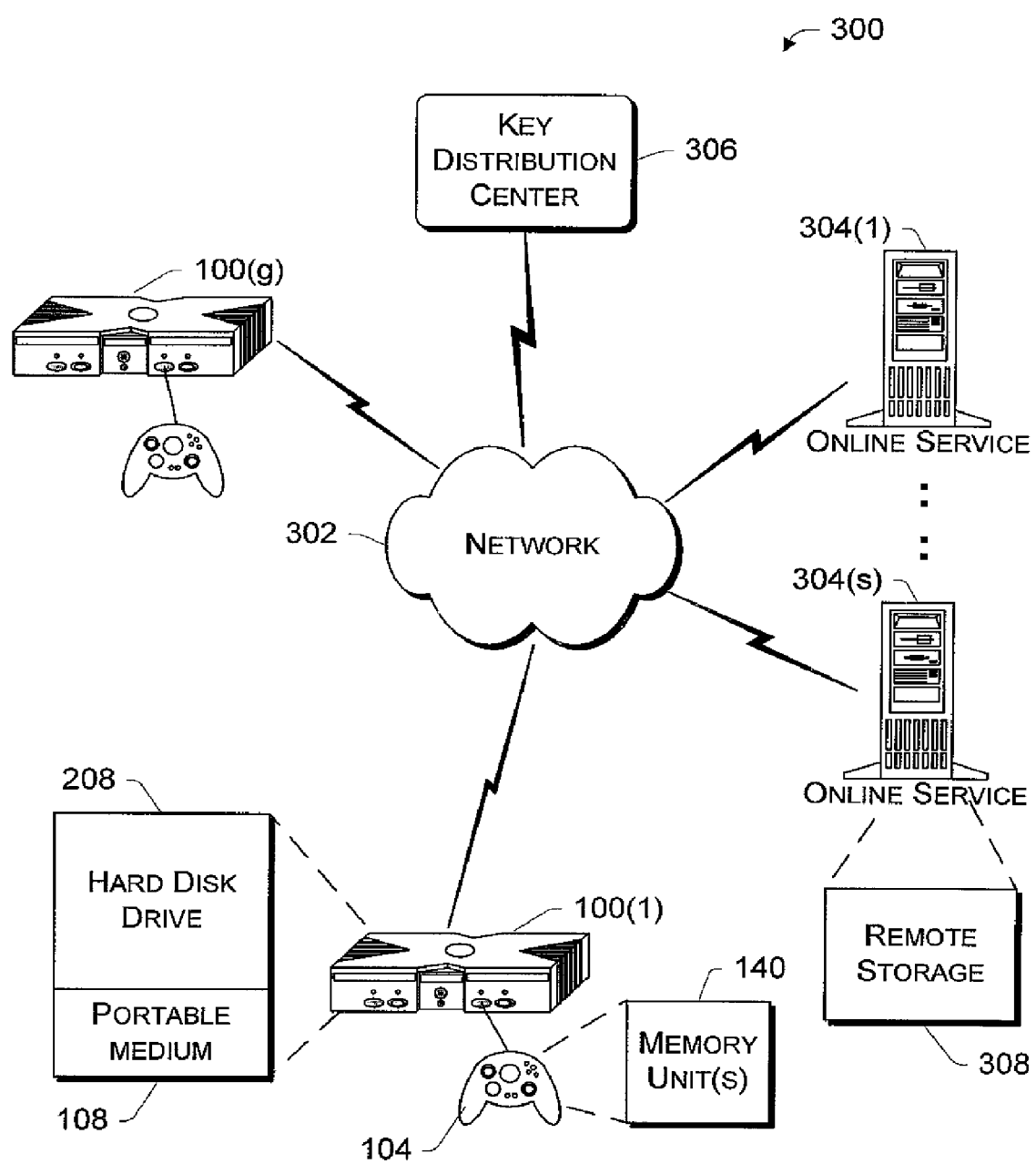
FIG. 3 illustrates a network gaming system in which the FIG. 1 gaming system is connected via a network to other consoles, services, and a ticket issuing entity.

FIG. 3 shows an exemplary network gaming environment 300 that interconnects multiple gaming systems 100(1), ..., 100(g) via a network 302. The network 302 represents any of a wide variety of data communications networks. It may include public portions (e.g., the Internet) as well as private portions (e.g., a residential Local Area Network (LAN)), as well as combinations of public and private portions. Network 302 may be implemented using any one or more of a wide variety of conventional communications media including both wired and wireless media. Any of a wide variety of communications protocols can be used to communicate data via network 302, including both public and proprietary protocols. Examples of such protocols include TCP/IP, IPX/SPX, NetBEUI, etc.

In addition to gaming systems 100, one or more online services 304(1), ..., 304(s) may be accessible via the network 302 to provide various services for the participants, such as hosting online games, serving downloadable music or video files, hosting gaming competitions, serving streaming audio/video files, and the like. The network gaming environment 300 may further involve a key distribution center 306 that plays a role in authenticating individual players and/or gaming systems 100 to one another as well as online services 304. The distribution center 306 distributes keys and service tickets to valid participants that may then be used to form games amongst multiple players or to purchase services from the online services 304.

The network gaming environment 300 introduces another memory source available to individual gaming systems 100—online storage. In addition to the portable storage medium 108, the hard disk drive 208, and the memory unit(s) 140, the gaming system 100(1) can also access data files available at remote storage locations via the network 302, as exemplified by remote storage 308 at online service 304(s).

Multi-User Authentication

To participate in an online gaming situation, it is desirable for every participant to authenticate themselves to one another. Ideally, the entities that should be authenticated include the users, the game title, the game console, and any online service the might be involved. One approach to authenticating each entity is to employ the well-known Kerberos authentication protocol, which is described in the above referenced Schneier book. With the Kerberos authentication protocol, each user would perform an independent authentication cycle with the key distribution center because Kerberos is only used to authenticate a single user identity at a time. Unfortunately, this results in multiple authentication cycles for the various users, which is undesirable in the gaming context.

To authenticate multiple users, the gaming system implements an authentication process that allows simultaneous authentication of all entities—game console, game title, and multiple users—in one request/reply exchange with the key distribution center. Moreover, a single ticket can be used to prove the particular game console and the multiple user identities playing at the game console. This is very efficient and highly desirable in the gaming context. In the described implementation, the process is a Kerberos-like authentication protocol.

Figure 4:
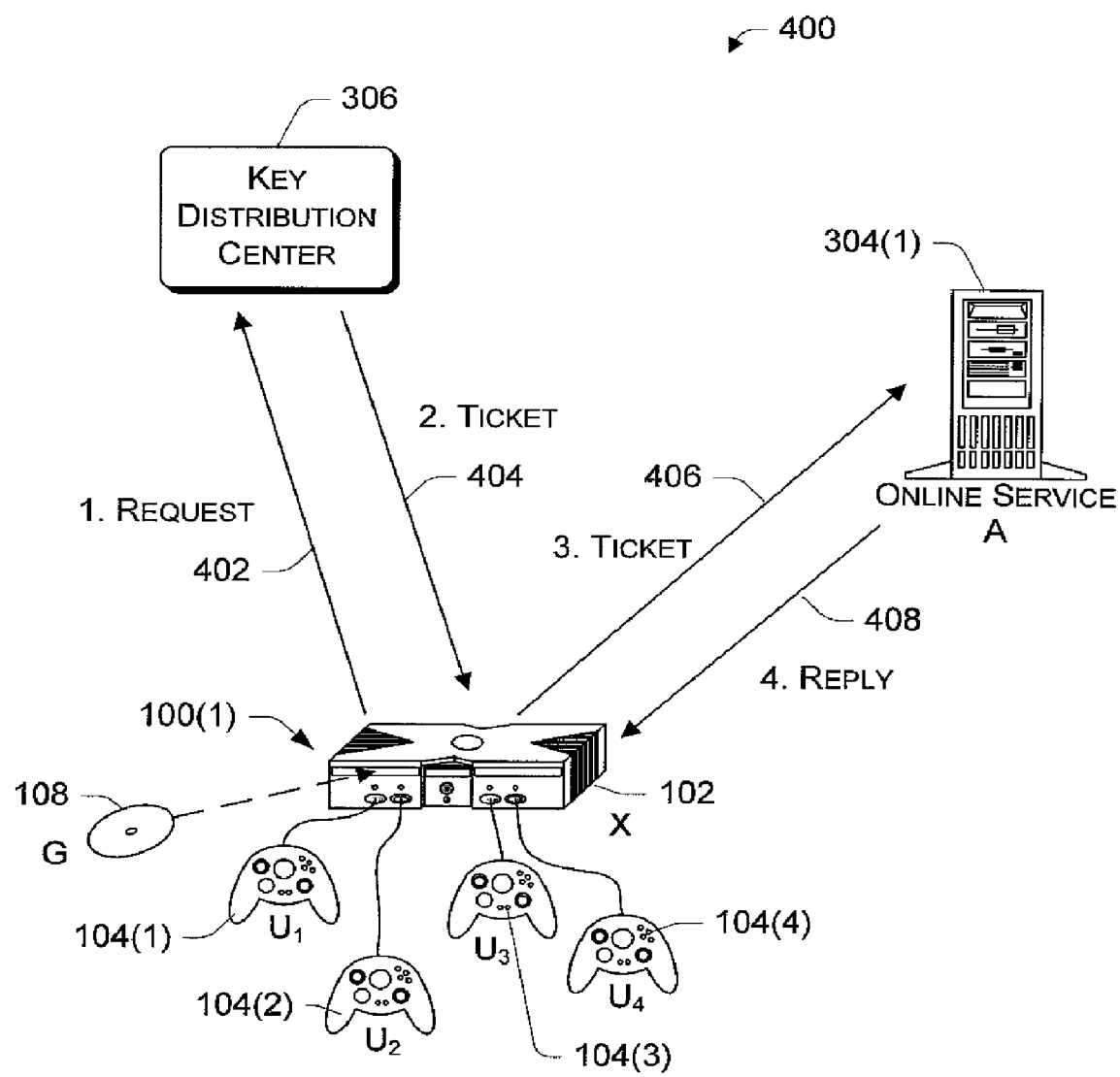
FIG. 4 illustrates a multi-user authentication process involving three participants: a game console, a ticket issuing entity, and an online service.

FIG. 4 shows three primary participants in the multi-user authentication process: the gaming system 100(1), an online service 304, and the key distribution center 306. The participants are networked together via the network 302 (not shown in FIG. 4) and are each capable of performing one or more routine cryptographic functions, such as encryption, decryption, one way hashing, random number generation, digital signing, and the like. Although more participants may be involved in the online gaming event, the illustrated participants represent an exemplary set of participants that are involved in the multi-user authentication process.

For discussion purposes, suppose there are four users of the gaming system 100(1), as represented by the four controllers 104(1)-104(4). Each user is given an identity $U_1$, $U_2$, $U_3$, and $U_4$ and is assigned a user key $K_1$, $K_2$, $K_3$, and $K_4$. The game console 102 is also assigned its own identity X and a game console key $K_X$. (One exemplary approach to assigning the game console identity and key is described below in more detail with reference to FIG. 6.) Additionally, the game title, which is shown here as a game disc 108, is assigned a separate identity G. In a similar manner, the online service 304 is assigned its own identity A and a key $K_A$.

The multi-user authentication process may be understood as a four-step process conducted in two roundtrip communication cycles. The first two steps occur during a single roundtrip request/reply exchange between the gaming system 100(1) and the key distribution center 306, which is illustrated as paths 402 and 404. The latter two steps occur during a single roundtrip request/reply exchange between the gaming system 100(1) and the online service 304, which is illustrated as paths 406 and 408. Note that the 406 request and 408 response are usually piggy backed on a regular online service request, and thus does not incur an extra round trip. Thus, the full authentication process may be carried out very quickly, with minimal information exchanges between the participants.

During the first request/reply exchange, the gaming system 100(1) submits a request asking the key distribution center 306 to issue a single ticket on behalf of all identities—game console X, game title G, and all four users $U_1$, $U_2$, $U_3$, and $U_4$—for purposes of participating with the online service 304 (i.e., path 402 in FIG. 4). The key distribution center 306 generates and returns a ticket for use with the desired online service (i.e., path 404 in FIG. 4). In this manner, the key distribution center 306 functions as a ticket issuing entity that issues tickets for services.

During the second request/reply exchange, the gaming system 100(1) submits the ticket to the online service 304 for authentication (i.e., path 406 in FIG. 4). The ticket is piggyback information along with the first request for the online service, and does not need to be sent in a separate request or until the service is needed. If valid, the online service 304 sends back a reply that can be used by the gaming system 100(1) to authenticate the online service 304 (i.e., path 408 in FIG. 4). If all entities are authenticated, the gaming system 100(1) can trust the returned results from the online service and can continue to interact with the online service 304.

The process illustrated in FIG. 4 is advantageous in that a single ticket obtained from the key distribution center 306 is used to prove the game console and the multiple user identities playing at the game console. This is much more efficient than the traditional approach where multiple tickets are needed, one for each authenticated principal.

Figure 5:
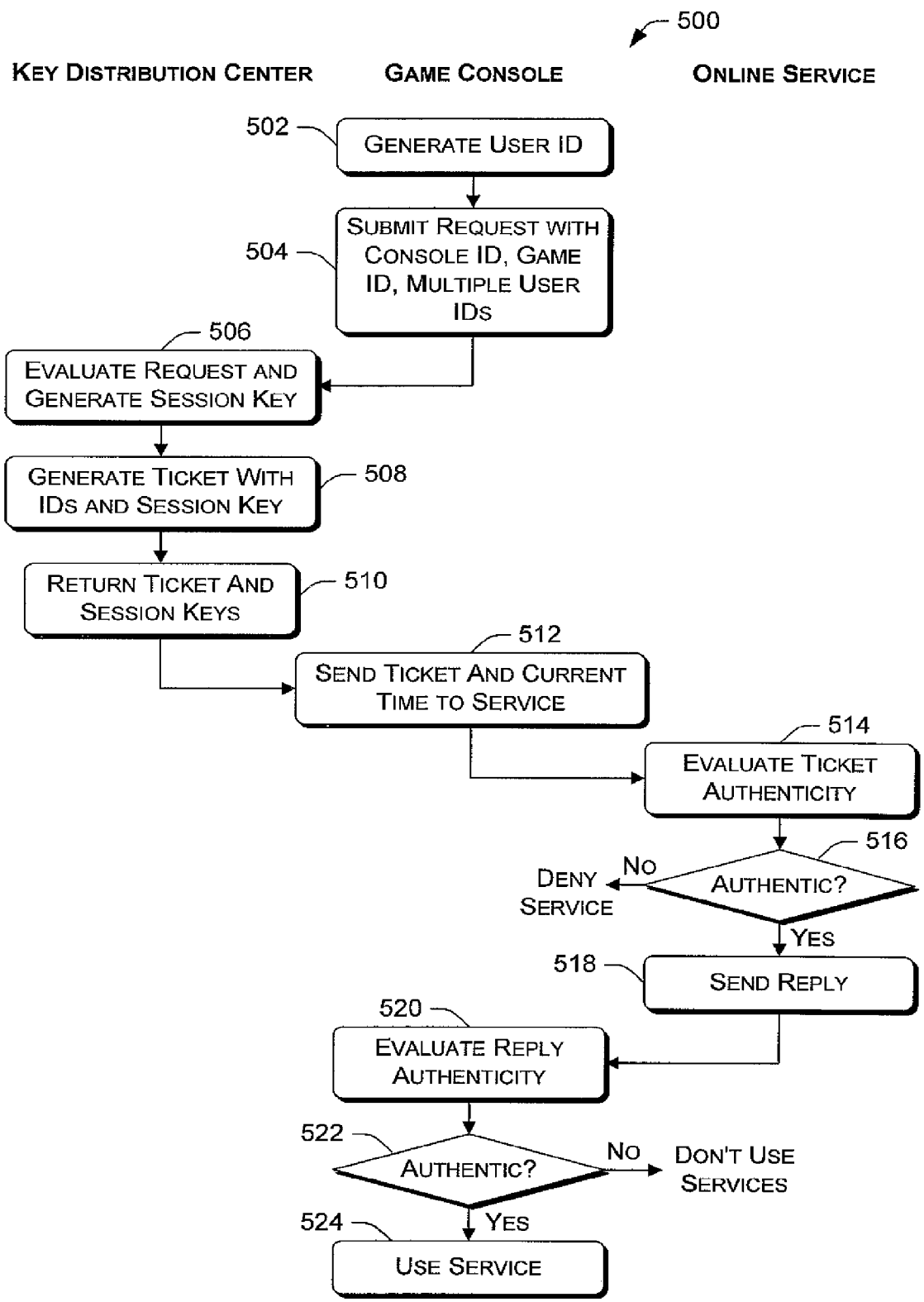
FIG. 5 is a flow diagram of the multi-user authentication process that facilitates authentication of multiple identities—game console, game title, multiple users.

FIG. 5 shows the multi-user authentication process 500 that is implemented by the three participants of FIG. 4. The process can be implemented in software as computer-executable instructions stored on various storage media at the participants. When executed, the instructions direct the various participants to perform operations illustrated as blocks in FIG. 5. The tasks are illustrated beneath headings "Key Distribution Center", "Game Console", and "Online Service" to convey an exemplary location as to which entities are performing them. The multi-user authentication process 500 will be described with reference to both FIGS. 4 and 5.

At block 502 in FIG. 5, the game console 102 generates validated user identities based on the user identities $U_1$, $U_2$, $U_3$, and $U_4$ and user keys $K_1$, $K_2$, $K_3$, and $K_4$. More specifically, the validated user identities include the user identities and values derived from the user keys. The validated user identities will be submitted with the request and used to demonstrate to the key distribution center 306 that the gaming system has knowledge of the user key and hence, implicitly authenticates the users.

One way to generate the key derivative value is to compute a cryptographic hash of the user key using the key of the game console. For user $U_1$ with key $K_1$, a hash $H_1$ is computed as follows:

$$H_1 = HMAC_{K_x}(K_1)$$

The hash $H_1$ forms the key derivative value. Another way is to encrypt the current time using the user key $K_1$, as follows:

$$H_1 = E_{K_1}(T)$$

Once again, the resulting value $H_1$ forms the key derivative value. The validated user identity is the combination of the user identity $U_1$ and the corresponding key derivative value $H_1$:

Validated User Identity=$(U_1, H_1)$.

At block 504 in FIG. 5, the game console 102 constructs a request containing the game console identity X, the game title identity G, the online service identity A of the service being requested, and multiple validated user identities $(U_1, H_1)$, $(U_2, H_2)$, $(U_3, H_3)$, and $(U_4, H_4)$. The request has the following identity string:

Request=$[X, G, A, (U_1, H_1), (U_2, H_2), (U_3, H_3), (U_4, H_4)]$

If the gaming system wanted authentication for more than online service, the identities of other services B, C, . . . , etc. are added to the request. Additionally, the request may include a version of the authentication protocol and a random nonce generated by the game console to resist replay attacks. The request may further include a checksum value to be used to verify receipt of the entire identity string. The game console 102 submits the request over the network 302 to the key distribution center 306 (i.e., path 402).

At block 506 in FIG. 5, the key distribution center 306 evaluates the request as well as the identities contained in the request. The distribution center 306 generates a random session key to be used for each service being requested by the gaming system 100(1). In this example, the center 306 generates a random session key $K_{XA}$ to be used during the second communication cycle involving the game console 102 and the online service 304. If other services are requested, additional random session keys $K_{XB}$, $K_{XC}$, . . . , etc. are produced.

At block 508 in FIG. 5, the key distribution center 306 generates a ticket that will subsequently be presented to the requested online service. There is one ticket issued for each service requested, but each ticket is effective for multiple 9 users. The ticket contains the identity string submitted in the request. It also includes a time $T_G$ that the ticket is generated, a time $T_L$ identifying the time length before expiration of the ticket, and the randomly generated session key $K_{XA}$ for the service requested. The ticket contents are encrypted via a symmetric key cipher (e.g., DES) that utilizes the online service's key $K_A$, as follows:

TicketA=$E_{K_A}[T_G, T_L, K_{XA}, X, G, A, U_1, U_2, U_3, U_4]$

Notice that the ticket does not carry the corresponding key derivative values $H_i$. Once the authentication server reads the key derivative values and believes the game console knows the user keys, the authentication server places the identities of the users within the issued tickets. Individual online services will subsequently believe in whatever the ticket tells it and hence do not need to see the key derivative values $H_i$.

If the gaming system sought tickets for more than one service, the key distribution center 306 issues multiple tickets, each ticket being encrypted with the public key of the desired online service, as follows:

TicketB=$E_{K_B}[T_G, T_L, K_{XB}, X, G, B, U_1, U_2, U_3, U_4]$

TicketC=$E_{K_C}[T_G, T_L, K_{XC}, X, G, C, U_1, U_2, U_3, U_4]$

:

TicketN=$E_{K_N}[T_G, T_L, K_{XN}, X, G, N, U_1, U_2, U_3, U_4]$

At block 510 in FIG. 5, the key distribution center 306 returns each ticket over the network 302 to the gaming system 100(1) (i.e., path 404). Since the game console 102 does not know the online service's key $K_A$, the game console 102 cannot open the ticket and alter the contents. The key distribution center also returns the session keys in an attached encrypted message. The session key message contains the ticket generation time $T_G$, the ticket expiration length $T_L$, and one or more session keys $K_{XA}$, $K_{XB}$, $K_{XC}$, etc., and all contents are encrypted using the game console's key $K_X$, as follows:

Session Key Message=$E_{K_X}[T_G, T_L, K_{XA}, K_{XB}, K_{XC}, \ldots]$

Since the session key message is encrypted with the game console's key $K_X$, the game console 102 is able to open the session key message and recover the session time parameters and session keys.

At block 512 in FIG. 5, the game console 102 passes the ticket, as is, onto the online service 304 (i.e., path 406). The game console 102 also generates and sends the current time T (instead of its own ID) encrypted with the random session key $K_{X4}$, as follows:

Time Message=$E_{K_{X4}}[T]$

At block 514 in FIG. 5, the online service 304 evaluates the authenticity of the ticket. It decrypts the ticket using its key $K_A$ to recover the contents, as follows:

$D_{K_A}[TicketA]$ $T_G$, $T_L$, $K_A$, X, G, A, $U_1$, $U_2$, $U_3$, $U_4$

The decrypted contents include the session key $K_{X4}$. The online service then uses the session key $K_{X4}$ to decrypt the time message and recover the time T, as follows:

$D_{K_{X4}}[Time\ Message]=T$

The online service 304 compares the recovered time sent from the game console with the current time. If the recovered time is not within an allowable time horizon from the current time, the online service deems the game console 102 as not authentic and the ticket as a forgery. In this case (i.e., the "No" branch from block 516), the online service denies service to the game console.

On the other hand, if the recovered time is within an allowable time window from the current time, the online service is assured that the game console 102 is authentic. In this case (i.e., the "Yes" branch from block 516), the online service generates a reply containing the time T in the request Time Message, encrypted with the session key $K_{X4}$, as follows:

Reply=$E_{K_{X4}}[T]$

At block 518, the online service 304 returns the reply over the network 302 to the gaming system 100(1) (i.e., path 408). Once again, this reply is piggybacked on a regular online service reply and does not incur an extra communication trip.

At block 520 in FIG. 5, the game console 102 evaluates the authenticity of the reply. The game console 102 decrypts the reply using the session key $K_{X4}$ that it previously received in the session key message from the key distribution center 306. If the game console 102 can successfully decrypt the reply, and the T value is the same as the T value originally sent in the Time Message, the game console is assured that the online service is authentic because the online service could not otherwise have known the random session key $K_{X4}$. In this case (i.e., the "Yes" branch from block 522), the game console is free to interact with the services offered by the online service (block 524). Otherwise, if the reply cannot be decrypted successfully (i.e., the "No" branch from block 522), the game console deems the online service as not authentic and forgoes its services.

The multi-user authentication process is built a top the three-participant model in the Kerberos authentication process. It differs from Kerberos in that it allows authentication of multiple users simultaneously, with one trip to the key distribution center and one ticket for all users. The extension involved, in part, defining new message strings to be passed among the participants.

An alternative implementation is to leverage the existing well-defined data packets employed in the conventional Kerberos protocol. Kerberos defines a packet that includes a data field known as the "Pre-Auth" data field for pre-authorized data. In the alternate implementation, the multiple validated user identities ($U_1$, $H_1$), ($U_2$, $H_2$), ($U_3$, $H_3$), and ($U_4$, $H_4$) are inserted into this "Pre-Auth" data field so that all users are authenticated in the same request. Also the Kerberos tickets issued would be modified to contain extra "Authorization Data" that contains the user identities that have been authenticated ($U_1$, $U_2$, $U_3$, $U_4$).

Establishing Game Console Identity and Key

The above multi-user authentication protocol hinges in part on the ability to establish the game console identity X and associated game console key $K_X$. This section describes how these parameters are created in the first place.

Generally, each game console 102 is manufactured with secret information that is very difficult to guess and very difficult to access. Tamper resistant designs are employed to physically protect the secret information on the game console from attacks on the hardware. The secret information is stored at a backend server is for use later at account creation time to verify whether the game console is authentic. The secret information may be the same for all or a batch of consoles, or unique for each console. Preferably, the secret information is unique so that if the information is compromised, only a single fake account can be created.

The establishment of a secure game console identity relies on the fact that console manufacturing is a regulated process and that all consoles have consistent characteristics, regardless of the manufacturing date. It also relies on the fact that because manufacturing is controlled by one or a limited number of entities, a robust and secure database of the secret information unique to each machine can be generated and used on the backend to verify that a particular game console is, in fact, a real console at the time a game console account is being created.

Figure 6:
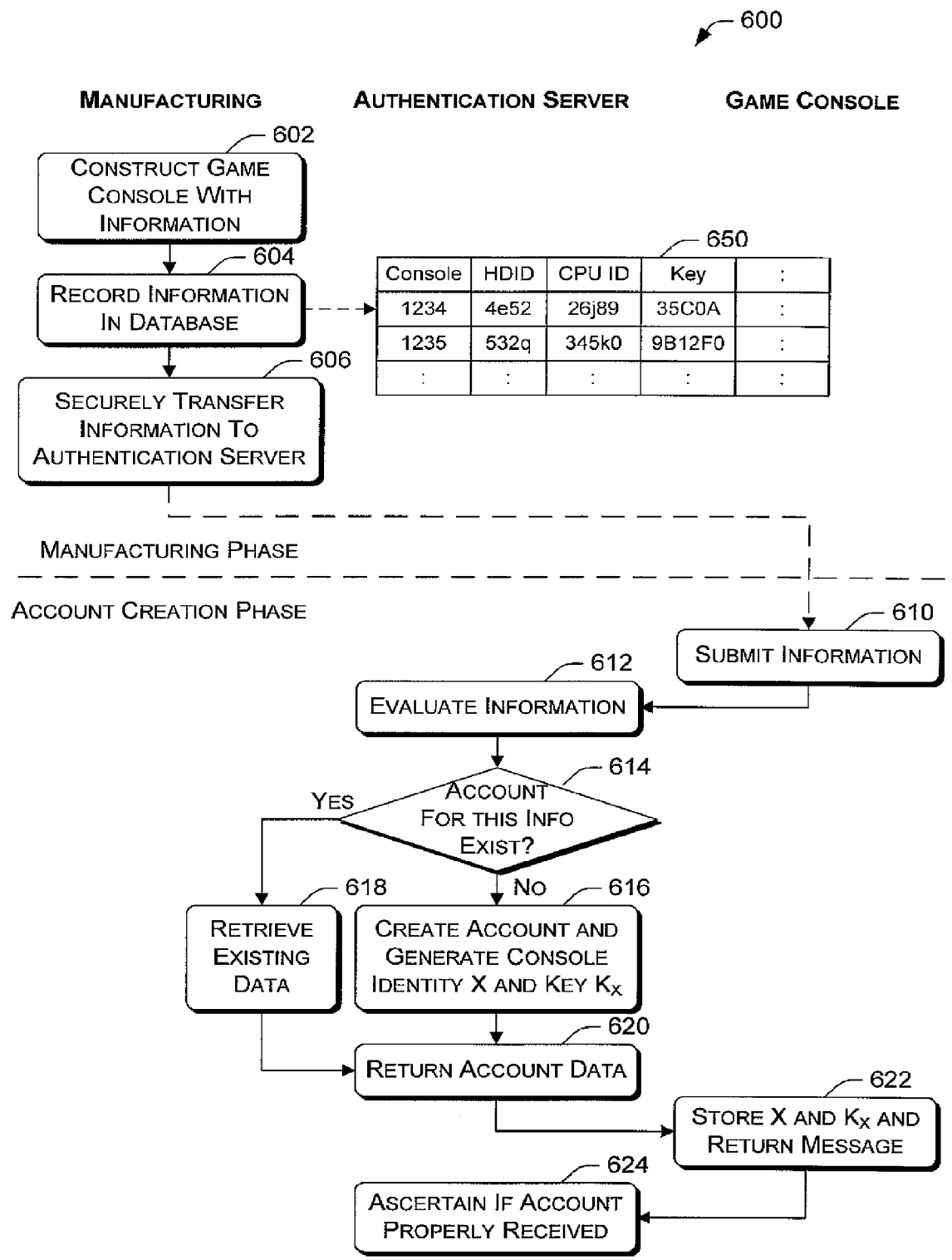
FIG. 6 is a flow diagram of a process for establishing a game console identity that is used in the multi-user authentication process.

FIG. 6 illustrates a process 600 for constructing a game console with secret information for use in establishing a console identity X and game console key $K_X$. The process 600 is performed in part during manufacturing and in part during account creation in which an online gaming account for the game console is created. These two phases are distinguished in FIG. 6 by a horizontal dashed line. The tasks are illustrated beneath headings "Manufacturing", "Authentication Server" and "Game Console" to convey exemplary locations as to where the tasks are performed.

At block 602, the manufacturer constructs the game console to incorporate one or more pieces of information at the time of manufacture. The information is preferably of the type that can be made available programmatically. In one implementation, the game console is built to include at least two pieces of information, one that is unique to the individual machine and a second that is very difficult to guess and access. The first piece of information need not be evenly distributed across a name space, nor does it need to be secret or hard to read, but it does need to be unique across the name space and accessible programmatically. For example, the first piece of information could be a console serial number is assigned by the manufacturer, a hard disk ID printed on the hard disk drive, or a serial number of any chip, ROM, firmware, or the like. This first piece of information will be used as the "name" of the game console to look up which row in table 650 corresponds to the particular game console.

The second piece of information does not necessarily need to be unique per machine, but is evenly distributed across its namespace. It is very difficult to guess and very difficult to access. Programmatic access is permitted via secure techniques, such as code-signing techniques, but physical access is controlled via hardware-based solutions that resist tampering and render physical attack and reverse engineering very difficult. Examples of the second piece of information include a CPU ID or a value derived from the CPU ID, such as a one-way hash of the CPU ID. Another example is a random key written onto disk at manufacturing time, the disk drive needs to be protected from unauthorized reading (like using the CPU ID) through some other means. This second piece of information will be used as the "key" for the game console, to prove that the game console is genuine and not some other computing device pretending to be a game console.

At block 604, the information is recorded in a database at the manufacturer as a set of database records 650. Each record includes, for example, an identity of the console, the hard disk ID (HDID), and the CPU ID. At block 606, the database records 650 are securely made available to an authentication server that may or may not be hosted by the key distribution center 306. In one implementation, a secure database replication procedure is employed to securely transfer the console information database to the authentication server. It is further noted that the same entity may or may not control the manufacturing and authentication server.

At this point, the two pieces of information can be used in the verification is of the game console and creation of the game console identity X and key $K_X$. Such information can be used to verify, for example, that the game console is valid and not an impersonating personal computer.

This completes the manufacturing phase of process 600. The game consoles are subsequently released from manufacturing and sold to consumers. When the user first decides to play an online game or access online services, the game console first obtains an account. This initiates the account creation phase of the process 600 in FIG. 6.

At block 610, the game console submits the information, or data derived from the information, to the authentication server. The information could be sent over a secure link (e.g., SSL) established between the game console and the authentication server. In one implementation, the game console submits the hard disk ID and the CPU ID assuming a secure connection is established, such as using SSL to protect the contents of the message. To avoid exposing the CPU ID, another implementation is to submit in place of the CPU ID, a one-way hash digest of the CPU ID in such a way that it is extremely difficult to deduce the CPU ID from the resulting value. Another way to prove knowledge of the CPU ID and to also prevent replay attacks is to send $E_{CPUID}(T)$ where the current time is encrypted with the CPU ID as the Key.

At block 612, the authentication server evaluates the information from the game console. In one implementation, the authentication server uses the information as an index into the console database records 650 to identify that the information is a correct combination of pieces. For instance, the authentication server determines whether the hard disk ID and CPU ID passed in from the game console form a correct pair recorded in the database as belonging to the same is game console. If there is a match, the authentication server can be assured that the client is a valid game console because it would be very difficult for an impostor to guess, manually or programmatically, both pieces of information and their relationship.

At block 614, the authentication server looks up in the console database records to determine whether an account has already been established for this information. If no account exists (i.e., the "No" branch from block 614), the authentication server creates an account and assigns a unique game console identity X and a randomly generated key $K_X$ to that account (block 616). If an account exists (i.e., the "Yes" branch from block 614), the authentication server retrieves the existing account information (block 618). The game console identity X and key $K_X$ are returned to the game console (block 620).

At block 622, the game console stores the game console identity X and key $K_X$ in a secure way to resist hardware attacks. It also sends back a message containing the identity X and the identity encrypted with the key $K_X$, or $E_{K_X}(X)$. Having the game console return a message allows the authentication server to ascertain whether the game console correctly received the account data. If the decrypted identity matches the non-encrypted identity, the game console received the account data correctly. If the two do not match, the game console received incorrect data and the authentication server should delete the account and restart the process at block 610.

If no reply is received from the game console, the authentication server cannot be sure if the account data successfully made it to the game console. In this case, the authentication server flags the account and waits for another new account creation for this game console (signifying that the game console did not receive the account data) or a successful logon (indicating that the game console did receive the account data).

At game time, the actual security of the console machine is achieved via the identity X and key $K_X$, as described previously in the multi-user authentication process.

CONCLUSION

The above processes are advantageous for many reasons. First, the multi-user authentication process is fast because it accomplishes all authentication for the gaming system, including multiple users, the game title, and the machine itself, in a single roundtrip communication with the key distribution center. After this initial roundtrip, the game console is able to communicate with any trusted services without re-communicating with the key distribution center. The whole process is accomplished with minimal user input and minimal delay before play can begin. The single ticket obtained from the authentication server is also unique in that it not only proves the particular game console, but also the multiple user identities playing at the game console. This is in contrast to the traditional approach where multiple tickets would need to be used (one for each authenticated principal).

Although the invention has been described in language specific to structural features and/or methodological acts, it is to be understood that the invention defined in the appended claims is not necessarily limited to the specific features or acts described, Rather, the specific features and acts are disclosed as exemplary forms of implementing the claimed invention.

The invention claimed is:

1. A computer-readable storage medium for a game console comprising computer-executable instructions that, when executed, direct the game console to:
   create multiple validated user identities (U1, H1), (U2, H2), . . . , (UU, HU) composed of the multiple user identities U1, U2, . . . , UU and associated values H1, H2, . . . , HU calculated from each user's key;
   form a single request containing a game console identity X, a game title identity G, the multiple validated user identities, and an identity A of an online service, as follows:

Request=[X, G, A, (U1, H1), (U2, H2), . . . , (UU, HU)]; and submit the request to a ticket issuing entity over a network, whereby the ticket issuing entity simultaneously authenticates each of the identities contained in the request.

2. A computer-readable storage medium as recited in claim 1, further comprising computer-executable instructions that, when executed, direct the game console to compute cryptographic hash digests of user keys associated with the multiple users, each user identity being a combination of the user identity and the cryptographic hash digest of an associated user key.

3. A computer-readable storage medium as recited in claim 1, further comprising computer-executable instructions that, when executed, direct the game console to encrypt a time value using keys associated with the multiple user identities, each user identity being a combination of the user identity and the encrypted time value.

4. A computer-readable storage medium as recited in claim 1, further comprising computer-executable instructions that, when executed, direct the game console to form the request to further include at least one of an identity of the game console, a random nonce, or a checksum value to ensure receipt of all contents of the request.

5. A computer-readable storage medium as recited in claim 1, further comprising computer-executable instructions that, when executed, direct the game console to:
- receive a ticket from the ticket issuing entity, the ticket containing the game console identity X, the game title identity G, the multiple validated user identities, the online service identity A, and a session key KXA together encrypted with an additional key KA associated with the online service;
- receive the session key KXA from the ticket issuing entity; and
- pass the ticket from the game console to the online service along with some information encrypted using the session key KXA.

6. A computer-readable storage medium for a game console comprising computer-executable instructions that, when executed, direct the game console to:
- create multiple validated user identities composed of multiple user identities and associated values calculated from each user's key, wherein the multiple user identities are playing at the same game console;
- form a single request containing a game console identity, a game title identity, the multiple user identities, and an identity of an online service; and
- submit the request to a ticket issuing entity over a network, whereby the ticket issuing entity simultaneously authenticates each of the identities contained in the request via issuance of one ticket covering all of the multiple user identities.

7. A computer-readable storage medium as recited in claim 6, further comprising computer-executable instructions that, when executed, direct the game console to compute cryptographic hash digests of user keys associated with the multiple users, each user identity being a combination of the user identity and the cryptographic hash digest of an associated user key.

8. A computer-readable storage medium as recited in claim 6, further comprising computer-executable instructions that, when executed, direct the game console to encrypt a time value using keys associated with the multiple user identities, each user identity being a combination of the user identity and the encrypted time value.

9. A computer-readable storage medium as recited in claim 6, further comprising computer-executable instructions that, when executed, direct the game console to form the request to further include at least one of an identity of the game console, a random nonce, or a checksum value to ensure receipt of all contents of the request.

10. A computer-readable storage medium as recited in claim 6, further comprising computer-executable instructions that, when executed, direct the game console to:
- receive a ticket from the ticket issuing entity, the ticket containing the game console identity, the game title identity, the multiple validated user identities, the online service identity, and a session key together encrypted with an additional key associated with the online service;
- receive the session key from the ticket issuing entity; and
- pass the ticket from the game console to the online service along with some information encrypted using the session key.

11. A method implemented via a game console, the method comprising:
- creating multiple validated user identities (U1, H1), (U2, H2), . . . , (UU, HU) composed of the multiple user identities U1, U2, . . . , UU and associated values H1, H2, . . . , HU calculated from each user's key;
- forming a single request containing a game console identity X, a game title identity G, the multiple validated user identities, and an identity A of an online service, as follows:

Request=[X, G, A, (U1, H1), (U2, H2), . . . , (UU, HU)]; and

- submitting the request to a ticket issuing entity over a network, whereby the ticket issuing entity simultaneously authenticates each of the identities contained in the request.

12. A method as recited in claim 11, further comprising computing cryptographic hash digests of user keys associated with the multiple users, each user identity being a combination of the user identity and the cryptographic hash digest of an associated user key.

13. A method as recited in claim 11, further comprising encrypting a time value using keys associated with the multiple user identities, each user identity being a combination of the user identity and the encrypted time value.

14. A method as recited in claim 11, further comprising forming the request to further include at least one of an identity of the game console, a random nonce, or a checksum value to ensure receipt of all contents of the request.

15. A method as recited in claim 11, further comprising:
- passing a ticket from the game console to the online service along with some information encrypted using a session key KXA;
- the passing being responsive to:
    - receiving the ticket from the ticket issuing entity, the ticket containing the game console identity X, the game title identity G, the multiple validated user identities, the online service identity A, and the session key KXA together encrypted with an additional key KA associated with the online service; and
    - receiving the session key KXA from the ticket issuing entity.

16. A gaming console configured to implement the method as recited in claim 11.

* * * * *